United States Patent [19]

Nishigaki et al.

[11] Patent Number: 4,726,921
[45] Date of Patent: Feb. 23, 1988

[54] METHOD FOR MANUFACTURING LOW TEMPERATURE FIRED CERAMICS

[75] Inventors: Susumu Nishigaki, Nagoya; Masashi Fukaya, Kuwana; Junzo Fukuda, Nagoya; Shinsuke Yano, Nagoya; Osamu Nakagawa, Nagoya, all of Japan

[73] Assignee: Narumi China Corporation, Aichi, Japan

[21] Appl. No.: 738,160

[22] Filed: May 24, 1985

[30] Foreign Application Priority Data

Jun. 1, 1984 [JP] Japan .................... 59-110974

[51] Int. Cl.$^4$ .................... C04B 35/64
[52] U.S. Cl. .................... 264/63; 65/33; 264/64; 501/128
[58] Field of Search .................... 264/63, 64

[56] References Cited

U.S. PATENT DOCUMENTS

| | | | |
|---|---|---|---|
| 3,380,838 | 4/1968 | Sack et al. | 106/39 |
| 4,153,491 | 5/1979 | Swiss | 264/63 |
| 4,301,324 | 11/1981 | Kumar et al. | 174/68.5 |
| 4,404,166 | 9/1983 | Wiech | 264/63 |
| 4,621,066 | 11/1986 | Nishigaki et al. | 501/128 |

FOREIGN PATENT DOCUMENTS

| | | |
|---|---|---|
| 1082016 | 5/1960 | Fed. Rep. of Germany . |
| 1220094 | 6/1966 | Fed. Rep. of Germany . |
| 50-119814 | 9/1975 | Japan . |
| 54-111517 | 8/1979 | Japan . |
| 58-17695 | 2/1983 | Japan . |
| 883287 | 11/1961 | United Kingdom . |
| 1342823 | 1/1974 | United Kingdom . |

*Primary Examiner*—James Derrington
*Attorney, Agent, or Firm*—Flynn, Thiel, Boutell & Tanis

[57] ABSTRACT

Low temperature fired ceramics are produced by a highly improved method, using a specially designed apparatus and the obtained ceramic products are very useful in various applications, such as electronic components, heat resistant articles, tablewares, kitchen utensils or decorative articles because of a combination of superior properties, particularly high heat resistance, high mechanical strength, low thermal expansion and low dielectric constant. In practicing the method, a low firable ceramic material is shaped into a green sheet and then converted to a dense fired ceramic product by rapid firing in an adequate air. In the firing step, the air feed ratio (the ratio of the quantity of feed of air to the theoretical quantity of air required for combustion) is controlled so as to be at least 1.5 thereby the aimed fired products can be obtained in a greatly reduced firing time, without causing deformation or warpage of the ceramics or ignition of the decomposition gases of a binder.

8 Claims, 9 Drawing Figures

Sintered body of glass of composition No. ① fired at 900°C

Sintered body of 60 wt. % of glass of composition No. ① and 40 wt. % of alumina, fired at 850°C
C: Alumina

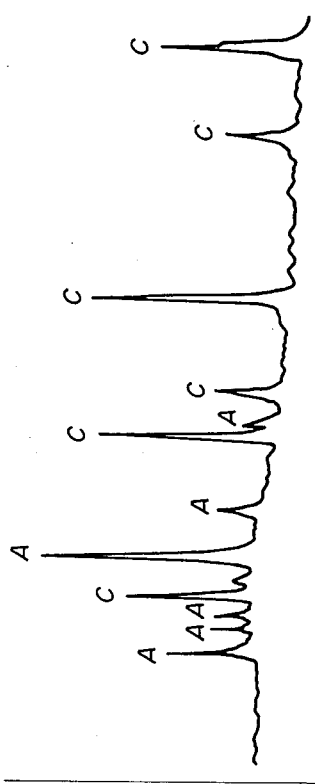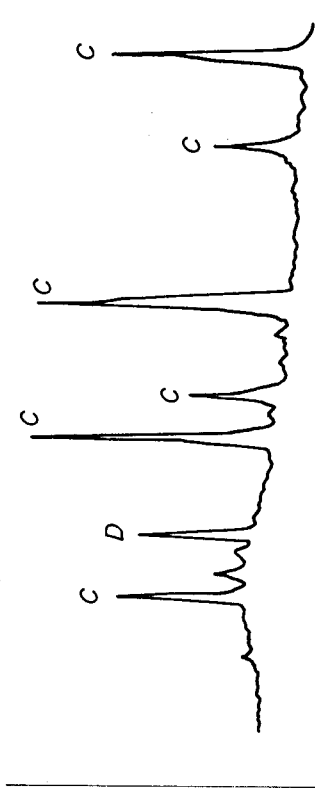
FIG. 3(C)
Sintered body of 60 wt. % of glass of composition No. ① and 40 wt. % of alumina, fired at 900°C
A: Anorthite
FIG. 3(D)
Sintered body of 55 wt. % of glass of composition No. ⑨ and 45 wt. % of alumina, fired at 850°C
D: Calcium silicate

METHOD FOR MANUFACTURING LOW TEMPERATURE FIRED CERAMICS

BACKGROUND OF THE INVENTION

The present invention relates to a method and an apparatus for manufacturing low temperature fired ceramics which are especially useful in electronic components or parts and further, useful in other various applications, such as heat-resistant industrial articles, tablewares, kitchen utensils and decorative articles.

Recently, there has been growing demand for a more densely integrated electronic circuits with the increasing trend toward miniaturization of computers or electronic devices of various equipment or facilities for public-utility. In such circumstances, substrates must satisfy the following requirements.

(1) Low cost
(2) Light weight
(3) High mechanical strength
(4) The substrates have a high thermal conductivity, thereby allowing rapid radiation of generated heat.
(5) In order to increase the density of a two-dimensional wiring a conductor width of 150 μm or finer can be achieved.
(6) The substrate sheets can be readily stacked in a multilayer configuration and thereby permit a three-dimensional wiring with an increased density.
(7) Passive parts, such as inductors, resistors or capacitors, can be integrally incorporated into a multilayered substrate in the case where a substrate sheet is multilayered.
(8) In order to minimize an electrostatic capacity between conductors, thereby realize rapid response to signals, their dielectric constant must be as small as possible.
(9) For the requirement (8), conductive materials with a low electrical resistance, for example, Ag, Ag-Pd, Cu, Au, can be employed.
(10) Dielectric layers have a small coefficient of thermal expansion near that of a Si semiconductor, i.e., $3.5 \times 10^{-6}/°C$., to be packaged thereon, thereby permitting the direct bonding of semiconductor chips thereto.
(11) Electrical resistivity between wires printed on a substrate is high.
(12) They are not adversely affected by temperature, humidity or other atmospheric conditions and have high stability properties.

Heretofore, for the above mentioned requirements, various organic multilayer substrates or alumina ceramic multilayer substrates have been employed. However, these conventional substrates are superior in some properties, but, in other properties, they are inferior. Therefore, any substrate heretofore available can not give satisfaction in all respects and presents problems or difficulties in practical applications.

More specifically, in the case of organic multilayer substrates, circuits are formed on copper cladding layers bonded onto the both sides of phenol resin or epoxy resin substrate sheets, then the resin sheets are bonded to form a multilayer configuration by using epoxy resin adhesives and through holes are formed between the conductors for interconnection by a mechanical perforation process. However, the organic resin multilayer substrates thus fabricated have the following problems:

(1) The substrates are subjected to warpage and cracking during repeated soldering or dip brazing or other similar thermal operations because of their poor heat resistance, low strength and unfavorably excess thermal expansion coefficient of the order of $50 \times 10^{-6}/°C$. and further their electrical resistivity will be detrimentally affected due to elevated temperature exposure.

(2) When elements, such as resistors or semiconductor IC chips, which tend to generate heat, are packaged on the conventional organic resin substrates, various special considerations or designs, for example, an enlarged bonding area for these elements or the use of radiating sheets, are required in order to prevent the elements from being heated up beyond acceptable temperature levels.

(3) In the fabrication of multilayer structures, it is very difficult to form fine conductors with a width of 150 μm or finer or numbers of through holes with a diameter of smaller than 200 μm.

(4) Reliability in heat or humidity stability is low.

On the other hand, multilayered alumina substrates have the following disadvantages:

(1) They are manufactured at a very high temperature of 1600° to 1700° C. in an atmosphere of hydrogen and such special conditions considerably increase their production cost compared with the former organic resin multilayer substrates.

(2) Since W or Mo is employed the conductive material, the resistance of the conductors is high.

(3) They exhibit a high density (from 3.8 to 3.9 g/cm$^3$) as compared to that of the organic resin substrate (2.0 g/cm$^3$).

(4) Their dielectric constant (9 to 10 at 1 MHz) is high as compared to the dielectric constant of the former organic substrates (3 to 5 at 1 MHz).

(5) Although they exhibit an appreciably lowered thermal expansion compared with the former organic substrate, their thermal expansion coefficient of $7.0 \times 10^{-6}/°C$. (from room temperature to 250° C.) is too large as compared to that of Si semiconductor.

In view of the above circumstances, there have been proposed several low temperature fired glass ceramic compositions.

As examples of low temperature fired ceramics, low temperature fired ceramics using crystallized glass are presented in some reports. For example, as disclosed in Japanese patent application laid-open No. 54-111517, for the purpose of obtaining lower temperature fired ceramics with a high strength, MgO-Al$_2$O$_3$-SiO$_2$ base composition containing additives of B$_2$O$_3$ and nucleating agent are fired at a temperature of 900° to 1000° C. to precipitate crystallites of cordierite in the resulting ceramics.

For the same purpose, there have been reported as other examples lower temperature fired ceramics produced from Li$_2$O-Al$_2$O$_3$-SiO$_2$ base compositions with additives of B$_2$O$_3$ and nucleating agent. In this composition, in order to increase the strength of the fired products, spodumene is precipitated. In general, in order to make ceramics at lower firing temperatures, the glass component is required to be contained in much larger quantities. However, in that case, it is very difficult to achieve a high strength of 1800 kg/cm$^2$ or higher. In either the case of MgO-Al$_2$O$_3$-SiO$_2$ or Li$_2$O-Al$_2$O$_3$-SiO$_2$, low temperature fired ceramics with a high strength are attained by precipitating high strength crystals therein by heat treating. However, in the cases of these known ceramic compositions, the desired crystals do not precipitate below 900° C. and the compositions are in a glassy phase in the vicinity of 500° to about 800° C. Thus, when fine conductor patterns are printed onto green ceramic sheets and are fired simultaneously together with the ceramics, the printed patterns tend to flow and thereby deform. Therefore, great difficulty has been experienced in the formation of circuits with a high precision. Further, another difficulty has been encountered in the firing process. When green ceramic sheets containing a large amount of an organic binder are fired to remove the organic binder component, it is requested to fire the sheets so as not to cause the organic binder to remain as carbon in the glass phase and, thus, firing should be carried out without softening glass and while maintaining their porosity at the level required to facilitate degassing. For such requirement, a heating rate in the firing step must be about 2° C. per minute and, as shown in FIG. 1, it takes eight hours to heat to 950° C.

Further, there are reported other low temperature fired ceramics using a mixture of a noncrystallized glass and insulating or refractory oxides. The examples are a borosilicate glass ($B_2O_3$-$SiO_2$) containing additives of refractory materials, such as cyanite or anorthite (Japanese patent application laid-open No. 50-119814) or a mixture of lead borosilicate glass ($B_2O_3$-$SiO_2$-$Al_2O_3$-PbO) and insulating oxides, such as forsterite and $ZrO_2$ (Japanese patent application laid-open No. 58-17695). These ceramics also, as in the case of low temperature fired ceramics using crystallized glasses previously set forth, can not successfully form circuits in a high resolution due to liability to flowing of patterns and, as referred to in Japanese patent application laid-open No. 50-119814, consume a very long firing time of 12 to 18 hours to heat to 900° C. due to a slow heating rate of the order of 1° C. per minute, as shown in FIG. 1. Japanese patent application laid-open No. 58-17695 states that the total firing time can be reduced to 30 to 60 minutes under the process conditions set forth therein, using a furnace used in a thick film formation. However, actually, such a reduced firing time can be applied only to a small quantity of samples. In the case of continuously firing a large quantity of samples, serious problems, such as warpage and cracking, will unavoidably occur because binder components can not be sufficiently removed. Further, in the cases of the noncrystallized glasses, since it is impossible to obtain a required strength level only from them, refractory materials are added to them in order to achieve an acceptable strength level in the composite systems of the noncrystallized glasses and the added refractory materials. However the noncrystallized glass phase does not crystallize even in a final firing stage at 800° to 1000° C. Thus such noncrystallized glass phase softens during firing and causes deformation of patterns. Further, softening of the glass makes degassing very difficult and, thus, the binder component is required to be slowly driven off by firing for a very long time at temperatures below the softening temperature of the glass. FIG. 2(B) shows shrinkage curves during firing for various low temperature fired ceramics. As can be seen from this figure, in both cases of crystallized glass and noncrystallized glass with addition of refractory materials, shrinkage due to softening of glass (noncrystallized or crystallized glass) is observed at temperatures of 200° to 700° C.

As previously described, conventional organic multilayer substrates have many problems in their properties, for example, in reliability, and alumina multilayer substrates are expensive because of very high firing temperature. Further, the alumina substrates are not satisfactory in regard to their properties or performance. Among the low-temperature fired ceramics proposed up to date, some ceramics approach the desired level in their properties. However, peculiar problems associated with the ceramics heretofore available have not yet been solved satisfactorily. For example, they require an unacceptably high production cost and consume a very long time in the firing process involving removing binder components and these disadvantages are not still really improved.

SUMMARY OF THE INVENTION

Therefore, it is an object of the present invention to provide a method and an apparatus for manufacturing low-temperature fired ceramics with a single- or multi-layered configuration in a considerably reduced firing time which ceramics have a large size (20 cm × 20 cm or larger) as compared to the low-temperature fired ceramics reported up to now and which exhibit an excellent heat resistance, high mechanical strength, small thermal expansion coefficient and low dielectric constant, which are adequate for the intended applications.

A first aspect of the present invention resides in a method of manufacturing low temperature fired ceramics, the method comprising the steps of:

forming a green sheet from a ceramic raw material firable at a temperature of 800° to 1000° C., according to a usual manner; and continuously firing the green sheet in an air furnace, wherein the firing is carried out by rapidly heating at a heating rate of 10° to 200° C./min, preferably 20° to 200° C./min., in order to reduce the firing time air is fed into a binder-removing zone of the furnace in such a manner that the air feed ratio defined by the following equation is at least 1.5. Air feed ratio=(Mean molecular weight of binder × Inflammability limit of mixed decomposition gases of binder × Rate of feed of air)/Rate of feed of green sheet × Weight ratio of binder in green sheet × 22.4)

In the above method, the ceramic raw material firable at a temperature of 800° to 1000° C. preferably has a composition consisting of, by weight percentage:
(a) 50 to 65% of powder glass consisting of 10 to 55% of CaO, 45 to 70% of $SiO_2$, 0 to 30% of $Al_2O_3$ and up to 10% of impurities; and
(b) 50 to 35% of powder $Al_2O_3$ containing up to 10% of impurities.

Further, preferably the ceramic composition contains $B_2O_3$ in an amount of up to 20% based on the total weight of the foregoing composition.

A second aspect of the present invention is directed to an apparatus employed in practice of the foregoing method, the apparatus comprising a furnace for firing low temperature firable ceramic materials, wherein the furnace is provided with an endless belt running at a high speed therein and an air-feeding inlet regulating the rate of feed of air, depending on the running speed of the endless belt and an exhausting section having means permitting the decomposition gases of binder to release from the furnace are disposed at the fore and rear of a binder-removing zone of the furnace, respectively.

DETAILED DESCRIPTION OF THE PREFERRED EMBODIMENTS

According to the first aspect cf the present invention, there is provided a method of manufacturing low temperature fired ceramics, the method comprising the steps of:

forming green sheets from ceramic materials which can be converted into the aimed fired ceramics by firing at a temperature of 800° to 1000° C., in accordance to an ordinary method; and continuously firing the green sheets in an air furnace. In the method, firing is performed by rapidly heating at a rate of 10° to 200° C./min, preferably 20° to 200° C./min., in order to save the firing time, and air is fed into a binder-removing zone of the furnace so that the air feed ratio defined by the the foregoing equation is 1.5 or more.

In the method of the present invention, the following low temperature firable composition is employed as a preferable ceramic material. Namely, by weight percentages, (a) 50 to 65% of powder glass consisting of 10 to 55% of CaO, 45 to 70% of $SiO_2$, 0 to 30% of $Al_2O_3$ and up to 10% of impurities; and (b) 50 to 35% of powder $Al_2O_3$ containing up to 10% of impurities.

Further, the composition may contain $B_2O_3$ in an amount of 20% or less based on the total weight of the foregoing composition.

The low temperature fired ceramics according to the present invention is basically different from any of the conventional low temperature fired ceramics previously set forth in behavior or mechanism of sintering. The $CaO-Al_2O_3-SiO_2$ or $CaO-Al_2O_3-SiO_2-B_2O_3$ system noncrystallized glass is partially crystallized in the course of the firing step by addition of $Al_2O_3$ and precipitates crystals of anorthite or anorthite+calcium silicate (wollastonite). Such partial crystallization not only makes possible firing at lower temperature of 800° to 1000° C. but also minimizes the deformation of fine patterns caused during the firing step and makes possible rapid firing.

Figure 3:
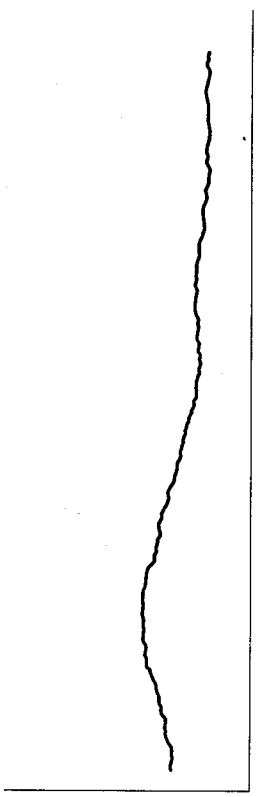
FIG. 3(A) is the x-ray diffraction pattern of noncrystallized $CaO-Al_2O_3-SiO_2-B_2O_3$ glass and FIGS. 3(B) and 3(C) are for the x-ray diffraction patterns showing the behaviors of the partial crystallization of the ceramics made from a mixture of $CaO-Al_2O_3-SiO_2-B_2O_3$ glass powder with $Al_2O_3$ powder in accordance with the present invention. Further.
FIG. 3(D) is for the x-ray diffraction patterns showing the behaviors of the partial crystallization of the ceramics made from a mixture of $CaO-SiO_2-B_2O_3$ glass powder with $Al_2O_3$ powder in accordance with the present invention.
Figure 3:
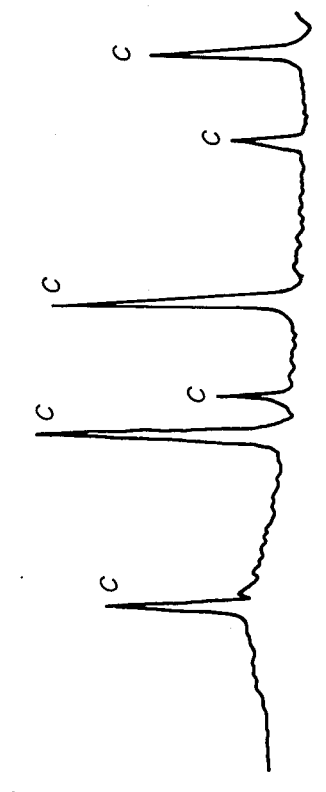

FIGS. 3(B), 3(C) and 3(D) evidently show the partial crystallization of the ceramics according to the present invention by x-ray diffraction. FIGS. 3(B) and 3(C) are the x-ray diffraction patterns of the sintered bodies of composition No. ① in Table given hereinafter which were made from $CaO-SiO_2-Al_2O_3-B_2O_3$ glass powder and $Al_2O_3$ powder and fired at 850° C. and 900° C., respectively, and FIG. 3(D) is for the sintered body of composition No. ⑨ made from $CaO-SiO_2-B_2O_3$ glass and $Al_2O_3$ powder an fired 850° C. FIG. 3(A) is the x-ray diffraction pattern for the sintered body of $CaO-Al_2O_3-SiO_2-B_2O_3$ glass (glass composition of composition No. ① without an addition of $Al_2O_3$ powder which was fired at 900° C. and, as can be seen from this figure, crystallization does not occur using this glass composition by the low temperature firing treatment as in the cases of the conventional $MgO-Al_2O_3-SiO_2$ or $Li_2O-Al_2O_3-SiO_2$ glass. However, as shown in FIGS. 3(B) and 3(C), addition of $Al_2O_3$ is found to precipitate anorthite crystals at $Al_2O_3$-glass interface of the resulting fired ceramics. Particularly, a large quantity of anorthite crystal is crystallized out by firing at 900° C. Further, as shown in FIG. 3(D), calcium silicate crystals may be also precipitated in some compositions. As set forth above, the raw materials for the low temperature fired ceramics of the present invention are mixtures made up of the specified noncrystallized glass compositions and alumina before firing, but after firing, the materials are converted into sintered products of partially crystallized ceramics comprising a noncrystallized glass, alumina and crystallized glass. When conventional low temperature fired ceramics with crystallized glass are produced, nucleating agents, such as $TiO_2$ or $ZrO_2$, are indispensably required. Whereas in the cases of the $CaO-Al_2O_3-SiO_2$ or $CaO-Al_2O_3-SiO_2-B_2O_3$ glass used in the present invention, it is considered that $Al_2O_3$ acts as nuclei and dissolves in the glass phase to some extent, thereby forming the anorthite crystal.

Figure 1:
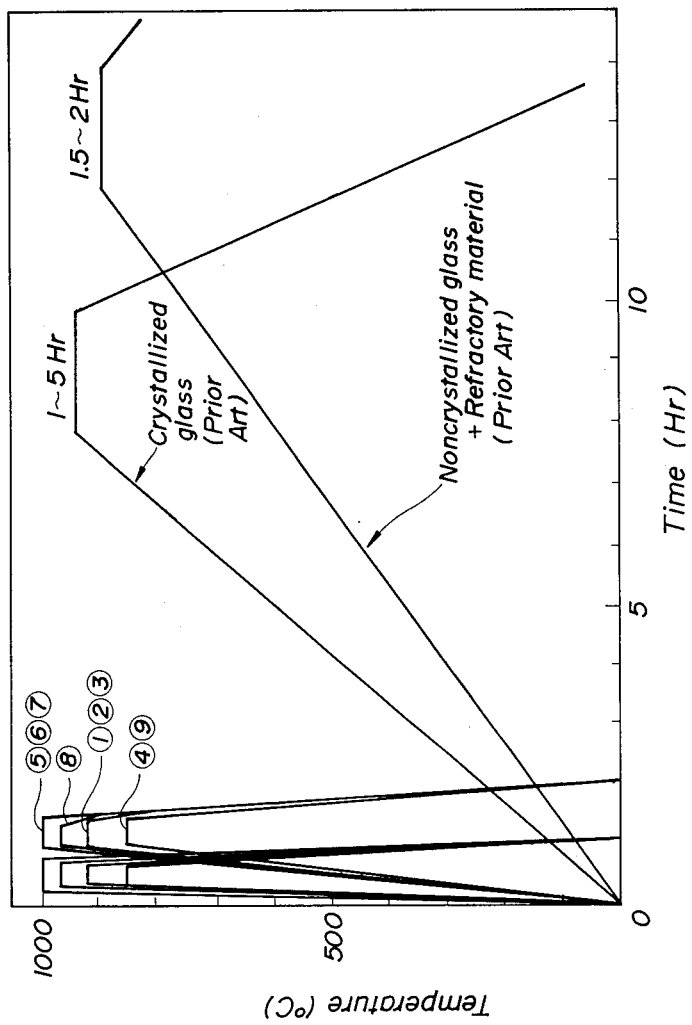
FIG. 1 is a time-temperature profile showing the rapid heating curves for the present invention (curve Nos. ① to ⑨ and the heating curves for low temperature fired ceramics heretofore available (crystallized glass and noncrystallized glass+refractory material).
Figure 2:
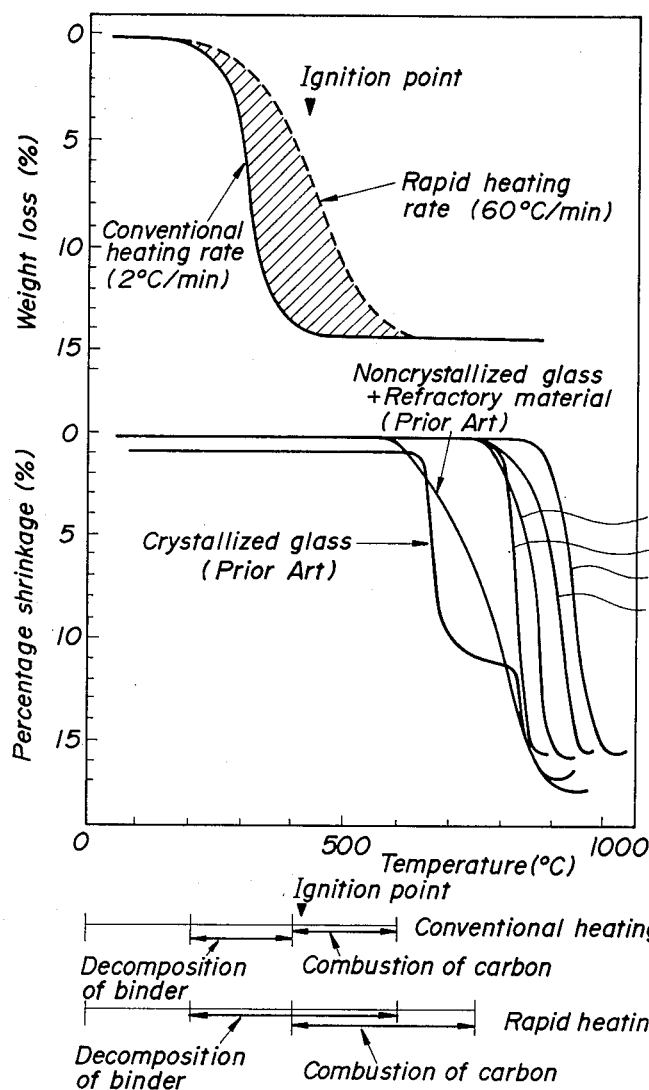
FIG. 2(A) shows the weight loss (%) of acryl resin due to its thermal decomposition.
FIG. 2(B) is a graphs showing shrinkage curves during firing for various low temperature fired ceramics.

Further, as is apparent from FIG. 2(B), the low temperature fired ceramic compositions of the present invention are retained in a porous state up to the firing temperatures of 730° to 850° C. without causing the softening and shrinking of the glass phase, even if rapidly heated at a heating rate of the order of 10 to 200° C./min and thereby the binder is readily removed from the ceramic compositions without causing cracks or incorporating carbon resulted from the decomposition of the binder into the glass phase. However, since the ceramics are rapidly shrunk and sintered by firing near the temperature range of 800° to 1000° C., a large-sized, dense ceramic substrate (for example, size of larger than 20 cm×20 cm) can be readily obtained in a shortened period. Such rapid sintering ability is believed to be due to the partial crystallization of the low temperature fired ceramics of the present invention and the fact that any shrinkage does not occur due to firing until being heated to 730° to 850 ° C.

Binders used in ceramic raw materials are thermally decomposed into the corresponding monomer gases with a small amount of carbon and the resulted monomer gases are released from the ceramics material. However, in order to completely burn out the carbon, the ceramics material should be fired at a very high temperature. Thus, if the materials can not be retained at a porous state in the course of the heating to such a very high combustion temperature of the carbon, the carbon can not permitted to leave out from the materials according to the reaction scheme of $C+O_2$ $CO_2$, from the material, and as a result, is trapped into the softened glass phase. Particularly, when ceramic materials are fired at a rapid heating rate, higher temperature firing is required for the combustion of carbon. Thus, the ceramic compositions are highly desired to be porous up to the higher firing temperature.

In other words, it is necessary to readily discharge the gases generated by decomposition of binders or by incomplete combustion of the same from the firing system. Otherwise, the decomposition gases and incomplete thermal combustion gases will catch fire and there ceramic green sheets will be excessively heated in certain portions, causing cracks. As one example, in the case where ceramic raw materials containing acryl resin as a binder are fired at a usual heating rate of 2° C./min. in a continuous belt furnace, the binder is thermally decomposed at temperature of 200° to 400° C. However, in the case of a rapid heating rate of 60° C./min., the decomposition temperature of the binder will increase to 200° to 600° C. and the gases resulted from decomposition of the binder are heated above their ignition point and begin to ignite. The ignition causes cracks in the ceramic sheets. The decomposition gases are mainly constituted by methyl methacrylate monomer and begins to fire from its ignition point of 421.1 C, as indicated in FIG. 2(A). FIG. 2(A) shows the weight loss (%) due to decomposition of the binder.

Figure 4:
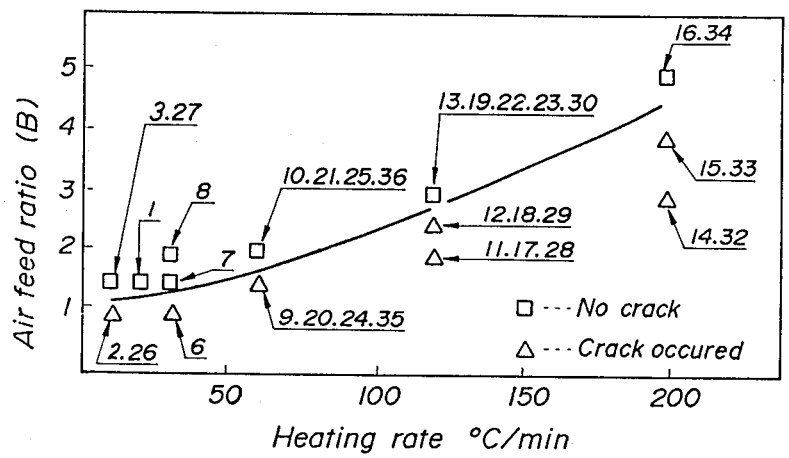
FIG. 4 is a graph showing the relation between heating rate and air feed ratio.

However, the inflammability limit of acrylate monomer gas is from 2.1 to 12.5 vol. %, and, thus, so long as acrylate monomer gas generating from the binder is kept in an amount less than 2.1 vol. % in the course of the firing, the material being fired does not ignite even if the material or the surrounding temperature reaches its ignition point or higher. Thus, as long as the acryl monomer gas generating from the fired material is removed promptly from the vicinity of the material by blowing a large quantity of air in a furnace, large-sized green sheets will be easily and rapidly heated without accompanying ignition. FIG. 4 shows the relation between heating rate and air feed ratio. As can be seen this figure, air feed ratio (B), namely, the ratio of the rate of feed of air to the theoretical rate of feed of air (A) required for combustion, defined by the following equation should be at least 1.5. The air feed ratio B, of course, may vary depending on change in heating rate and the size of a used furnace (the sectional area of a muffle). In a usual practice, B of not less than 50 is undesirable. In the following, equations (I), (II) and (III) are the theoretical rate of feed of air (A), the ratio (B) of the rate of feed of air to the theoretical rate of feed of air, air flow rate (C), respectively.

$$A\ (Nl/min) = \frac{\text{Rate of feed of green sheet (g/min)} \times \text{Weight ratio of binder in green sheet} \times 22.4\ (Nl)}{\text{Mean molecular weight of binder} \times \text{Inflammability limit of mixed decomposition gases of binder}} \quad (I)$$

$$B\ (\text{air feed ratio}) = \text{Rate of feed of air}\ (Nl/min)/A \quad (II)$$

$$C\ (\text{air flow rate, m/min}) = \frac{573\ (\text{Average temperature of binder-removing zone, °K.}) \times A \times B}{273 \times \text{Sectional area of muffle}\ (m^2) \times 10^3} \quad (III)$$

Since the low temperature fired ceramics according to the present invention employs a powdered glass made of glass-forming components of CaO, $SiO_2$ and $Al_2O_3$, Cu can be used as a conductor in an atmosphere of $N_2$ without being reduced. The composition used in the present invention can be fired in any of oxidizing, reducing or inert atmospheres.

As further advantages, the ceramic composition material does not shrink up to a firing temperature of 730° to 850° C., and at a final firing stage, partial crystallization occurs therein, whereby flowing of glass is prevented and fine patterns with a high precision can be readily obtained without causing any deformation of printed fine patterns. Therefore, the multilayered green ceramic substrate and electrical elements, for example, conductors, resistors or capacitors printed therein are simultaneously fired and thereby fine patterns with a high precision can be obtained. Further, Ru resistor, Cu conductor or the like can be applied onto the fired ceramic substrate by conventional thick film printing techniques and fired without any accompanying deformation. The cause of this is ascribable to the fact that the fired ceramics are, as set forth above, partially crystallized and no longer subject to any deformation by refiring at a temperature of 750° to 950° C.

Although the foregoing composition limit is preferably used in the present invention, the rapid firing process according to the present invention can be also applied to any other ceramic compositions as long as they are basically similar to the composition specifically set forth above in sintering mechanism.

The second aspect of the present invention is directed to an apparatus used in practicing the method of the present invention set forth above, the apparatus having a specially designed furnace for firing the low temperature firable ceramic material to be fired at a temperature of 800° to 1000° C. The furnace is provided with an endless belt running at a high speed therein and an air-feeding inlet regulating the rate of feed of air depending on the running speed of the endless belt and an exhausting section having a removing means permitting the decomposition gases of the binder to release from it are disposed at the fore and rear thereof, respectively.

Since the apparatus according to the present invention heats rapidly the ceramic material firable at a temperature of 800° to 1000° C., it is required to be so designed that the endless belt can convey the ceramic material mounted thereon at a high running rate. Further, the air-feeding inlet port is disposed in front of the binder-removing zone in order to control the rate of feed of air in accordance to the running rate of the endless belt. The exhausting section having the means for removing decomposition gas is positioned at the back of the binder-removing zone. As the removing means, two types of removing means can be employed. The first one is means for burning out by an afterburner and another one is means for collecting the decomposition gases. If such removing means is not provided, a large quantity of gas released by the decomposition of binder may go back into the furnace or liquefied gas resulted from the condensation of the decomposition gas flows into the furnace through an exhausting pipe and change again to a gaseous state, causing a serious contamination problem in the portions other than the binder-removing zone. Further, the position of the air-feeding inlet, air feeding and the exhausting section should be designed so that the air blown into the furnace uniformly come into contact with the surface of a green sheet and flow on it.

Figure 5:
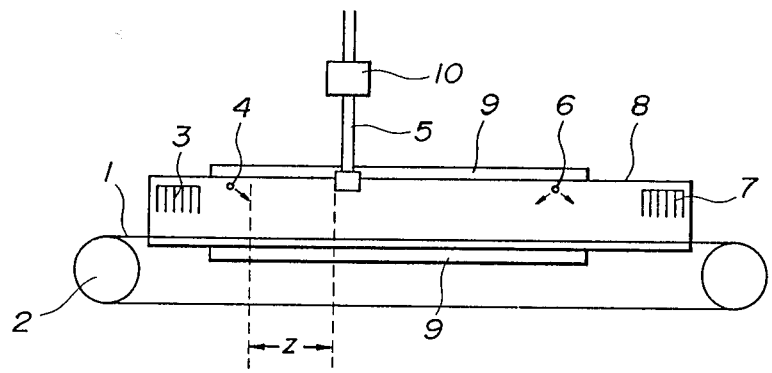
FIG. 5 is a front view illustrating an embodiment of an apparatus according to the present invention.

A preferred embodiment of the apparatus according to the present invention will now be described referring to FIG. 5. In FIG. 5, an endless belt 1 fabricated from a mesh is disposed in a muffle furnace 8 in such a manner that the belt 1 is driven by driving means 2. An inlet air-curtain 3 and an outlet air-curtain 7 are provided at the fore and back of the furnace and a heating section 9 is in the middle of the furnace. The fore part of the heating section 9 is a so-called binder-removing zone Z and an air-feeding inlet 4 is disposed in front of the Zone Z. The air-feeding inlet 4 is designed so as to control the rate of feed of air depending on the running speed of the endless belt 1. An exhausting section 5 is disposed at the end portion of the binder-removing zone Z and is provided with a removing means 10 for decomposition gases at its midpoint. The removing means 10 may be either a burner for burning out decomposition gases or means for collecting them. An inlet 6 for blowing air for combustion is disposed at the rear of heating section 9.

Now, the first aspect will be described hereinafter in more detail with reference to the detailed examples in which the apparatus set forth above was employed. In the examples, all percentages are by weight unless otherwise specified.

EXAMPLE 1

2400 g of glass consisting of 20% of CaO, 60% of $SiO_2$, 20% of $Al_2O_3$ and 10% based on the total weight of the foregoing three components of $B_2O_3$ and 1600 g of $Al_2O_3$ having an average primary particle size of 1.2 μm were wet-ground and mixed for 24 hours using an alumina pot mill containing alumina balls therein to form a uniform mixture of composition No. ② shown in Table 1 below. After drying the mixture, 100 g of methacrylate type binder, 50 g of plasticizer (dioctyl adipate) and 280 g of solvent (toluene) were added to 1000 g of the dry powder mixture, uniformly mixed using the alumina pot mill and shaped to a slip. The slip was formed into a 1.0 mm thick green sheet using a tape casting machine in accordance to a usually practiced doctor blade method. The resulting green sheet was cut into a sheet having a size of 25 cm×25 cm using a metallic mold and then mounted on an endless belt 1. After speeding up the rate of the belt 1, the greensheet was continuously fired by heating to a peak temperature of 900° C. at a heating rate of 60° C./min and holding at this peak temperature for 15 minutes. An air feed ratio B of the inlet 4 was kept at 2 during the firing. In the continuous belt furnace, the sectional area of its muffle and the width of the belt 1 were 0.1 m² and 35 cm, respectively, and the firing rate was one piece (pc) for 3.8 minutes.

As a result, there was obtained a dense fired ceramic substrate (specimen No. 10) having a size larger than 20 cm×20 cm, without warpage.

EXAMPLE 2

The same green sheet as prepared in Example 1 were mounted on the belt 1 running at a further increased rate and fired by heating to a peak temperature of 900° C. at a heating rate of 200° C./min and holding at the peak temperature for 15 minutes, employing the same continuous belt furnace as in Example 1. The air feed ratio B was 5 and the firing rate was one pc for 1.1 minutes.

There was obtained a dense fired ceramic substrate (specimen No. 16) with a size larger than 20 cm×20 cm without causing warpage.

EXAMPLE 3

2600 g of glass consisting of 23% of CaO, 62% of $SiO_2$ and 15% of $Al_2O_3$ and 1400 g of $Al_2O_3$ with an average primary particle size of 1.2 μm were wet-ground for 24 hours using an alumina pot mill containing alumina balls to form a uniform mixture of composition No. ⑤ given in Table 1 below. After drying the mix, 100 g of methacrylate type binder, 50 g of plasticizer (dioctyl adipate) and 280 g of solvent (toluene) were added to 1000 g of the dry powder mixture, uniformly mixed using an alumina pot mill containing alumina balls therein and shaped to a slip. The slip was formed into a 0.5 mm thick green sheet using a tape casting machine in accordance to a usually practiced doctor blade method.

Two of the resulting green sheets were bonded to each other at 100° C., using a hot pressing machine to provide a laminate green sheet with a thickness of 1.0 mm. The laminate green sheet was cut into a sheet with a size of 25 cm×25 cm using a metallic mold and then continuously fired by heating to a peak temperature of 1000° C. at a heating rate of 120° C./min and holding for 15 minutes at the peak temperature, employing the same continuous belt furnace as in Example 1. The air feed ratio B was controlled to 3 and firing rate was one pc for 1.9 minutes.

There was obtained a dense fired ceramic substrate (specimen No. 22) with a size larger than 20 cm×20 cm without causing warpage.

EXAMPLE 4

2400 g of glass consisting of 35% of CaO, 45% of $SiO_2$, 20% of $Al_2O_3$, and 10% based on the total weight of the former three components of $B_2O_3$ and 1600 g of $Al_2O_3$ with an average primary particle size of 1.2 μm were wet-ground for 24 hours using an alumina pot mill containing alumina balls to form a uniform mixture of composition No. ⑧ shown in Table 1.

After drying the mixture, 100 g of methacrylate type binder, 50 g of plasticizer (dioctyl adipate) and 280 g of solvent (toluene) were added to 1000 g of the dry powder mixture, uniformly mixed using an alumina pot mill containing alumina balls and shaped to a slip. The slip was formed into a 0.3 mm thick green sheet using a tape casting machine in accordance to a usually practiced doctor blade method.

Then, three of the green sheets were bonded at 100° C. by a hot pressing machine to provide a laminate green sheet with a thickness of 0.9 mm. The laminate green sheet was cut into a sheet with a size of 25 cm×25 cm using a metallic mold and then continuously fired by heating to a peak temperature of 950° C. at a heating rate of 200° C./min and holding at the peak temperature for 15 minutes, employing the same continuous belt furnace as in Example 1. The air feed ratio B was 5 and the firing rate was 1 pc for 3.4 minutes.

The thus obtained substrate (specimen No. 34) was a dense fired substrate with a size larger than 20 cm×20 cm and free from warpage.

Further, other fired ceramic products were produced under the process conditions given in Table 1, using the compositions specified in the same table. The properties of the resulting products are summarized in Table 2 together with the products of Examples 1 to 4 previously described.

TABLE 1

| Specimen No. | Composition No. | Glass Composition (wt. %) | | | | Glass/Alumina | Firing conditions | | B*2 | C*3 |
|---|---|---|---|---|---|---|---|---|---|---|
| | | CaO | SiO$_2$ | Al$_2$O$_3$ | B$_2$O$_3$*1 | | Heating rate °C./min | Peak temp. °C. | | |
| 1 | ① | 30 | 65 | 5 | 10 | 60/40 | 20 | 900 | 1.5 | 0.3 |
| 2 | ② | 20 | 60 | 20 | 10 | 60/40 | 10 | 900 | 1 | 0.2 |
| 3 | | | | | | | 10 | | 1.5 | 0.3 |
| 4 | | | | | | | 30 | | 2 | 1.3 |
| 5 | | | | | | | 30 | | 4.5 | 30 |
| 6 | | | | | | | 30 | | 1 | 0.3 |
| 7 | | | | | | | 30 | | 1.5 | 0.5 |
| 8 | | | | | | | 30 | | 2 | 0.7 |
| 9 | | | | | | | 60 | | 1.5 | 1 |
| 10 | | | | | | | 60 | | 2 | 1.3 |
| 11 | | | | | | | 120 | | 2 | 2.7 |
| 12 | | | | | | | 120 | | 2.5 | 3.3 |
| 13 | | | | | | | 120 | | 3 | 4 |
| 14 | | | | | | | 200 | | 3 | 6.7 |
| 15 | | | | | | | 200 | | 4 | 9 |
| 16 | | | | | | | 200 | | 5 | 11 |
| 17 | ③ | 30 | 55 | 15 | 10 | 60/40 | 120 | 900 | 2 | 2.7 |
| 18 | | | | | | | | | 2.5 | 3.3 |
| 19 | | | | | | | | | 3 | 4 |
| 20 | ④ | 35 | 45 | 20 | 10 | 60/40 | 60 | 850 | 1.5 | 1 |
| 21 | | | | | | | 60 | 850 | 2 | 1.3 |
| 22 | ⑤ | 23 | 62 | 15 | 0 | 65/35 | 120 | 1000 | 3 | 4 |
| 23 | ⑥ | 10 | 70 | 20 | 20 | 60/40 | 120 | 1000 | 3 | 8 |
| 24 | ⑦ | 10 | 60 | 30 | 20 | 60/40 | 60 | 1000 | 1.5 | 1 |
| 25 | | | | | | | 60 | | 2 | 1.3 |
| 26 | ⑧ | 35 | 45 | 20 | 10 | 60/40 | 10 | 950 | 1 | 0.1 |
| 27 | | | | | | | 10 | | 1.5 | 0.2 |
| 28 | | | | | | | 120 | | 2 | 2.7 |
| 29 | | | | | | | 120 | | 2.5 | 3.3 |
| 30 | | | | | | | 120 | | 3 | 4 |
| 31 | | | | | | | 120 | | 45 | 60 |
| 32 | | | | | | | 200 | | 3 | 6.7 |
| 33 | | | | | | | 200 | | 4 | 9 |
| 34 | | | | | | | 200 | | 5 | 11 |
| 35 | ⑨ | 50 | 50 | 0 | 10 | 55/45 | 60 | 850 | 1.5 | 1 |
| 36 | | | | | | | 60 | | 2 | 1.3 |
| 37 | ⑩ | 20 | 75 | 5 | 20 | | | | | |
| 38 | ⑪ | 5 | 70 | 25 | 20 | 60/40 | 60 | 1000 | 2 | 1.3 |
| 39 | ⑫ | 15 | 30 | 35 | 20 | | | | | |

*1: Weight percentage based on the total weight of each glass composition except B$_2$O$_3$.
*2: B = Air feed ratio
*3 C (air flow rate, m/min) = $\dfrac{573 \text{ (Average temperature of binder-removing zone, °K.)} \times \text{Rate of feed of air}}{273 \times \text{Sectional area of muffle (m}^2\text{)} \times 10^3}$ The glass compositions of specimen Nos. 37 and 38 could not be fritted.

TABLE

| | | Properties of Ceramic substrates | | | | | | | |
|---|---|---|---|---|---|---|---|---|---|
| Specimen No. | Composition No. | External view*1 | Bulk specific gravity g/cc | Flexural strength kg/cm$^2$ | Thermal Exp. Coeff.*2 × 10$^{-6}$/°C. | Dielectric Constant ε at 1 MHz | tan δ at 1 MHz × 10$^{-4}$ | Specific resistance cm-Ω | Furnace size*3 |
| 1 | ① | Good | 2.9 | 2100 | 5.5 | 7.7 | 3 | >10$^{14}$ | L |
| 2 | | Crack | | | | | | | S |
| 3 | | Good | | | | | | | S |
| 4 | | Good | | | | | | | S |
| 5 | | Good | | | | | | | S |
| 6 | | Crack | | | | | | | L |
| 7 | | Good | | | | | | | L |
| 8 | | Good | | | | | | | L |
| 9 | ② | Crack | 2.9 | 2400 | 5.3 | 7.8 | 4 | >10$^{14}$ | L |
| 10 | | Good | | | | | | | L |
| 11 | | Crack | | | | | | | L |
| 12 | | Crack | | | | | | | L |
| 13 | | Good | | | | | | | L |
| 14 | | Crack | | | | | | | L |
| 15 | ② | Crack | 2.9 | 2400 | 5.3 | 7.8 | 4 | >10$^{14}$ | L |
| 16 | | Good | | | | | | | L |
| 17 | | Crack | | | | | | | L |
| 18 | ③ | Crack | 3.0 | 1900 | 5.3 | 8.4 | 1 | >10$^{14}$ | L |
| 19 | | Good | | | | | | | L |
| 20 | ④ | Crack | 3.0 | 1900 | 5.3 | 8.4 | 1 | >10$^{14}$ | L |
| 21 | | Good | | | | | | | L |
| 22 | ⑤ | Good | 2.8 | 2700 | 6.0 | 7.8 | 4 | >10$^{14}$ | L |
| 23 | ⑥ | Good | 2.8 | 2000 | 4.9 | 6.6 | 2 | >10$^{14}$ | L |

TABLE-continued

| Specimen No. | Composition No. | External view*1 | Bulk specific gravity g/cc | Flexural strength kg/cm² | Thermal Exp. Coeff.*2 × 10⁻⁶/°C | Dielectric Constant ε at 1 MHz | tan δ at 1 MHz × 10⁻⁴ | Specific resistance cm-Ω | Furnace size*3 |
|---|---|---|---|---|---|---|---|---|---|
| 24 | ⑦ | Crack | 2.9 | 2000 | 4.9 | 7.0 | 3 | >10¹⁴ | L |
| 25 | | Good | | | | | | | L |
| 26 | | Crack | | | | | | | L |
| 27 | | Good | | | | | | | L |
| 28 | | Crack | | | | | | | L |
| 29 | | Crack | | | | | | | L |
| 30 | ⑧ | Good | 2.9 | 2100 | 5.1 | 7.4 | 7 | >10¹⁴ | L |
| 31 | | Good | | | | | | | L |
| 32 | | Crack | | | | | | | L |
| 33 | | Crack | | | | | | | L |
| 34 | | Good | | | | | | | L |
| 35 | ⑨ | Crack | 3.0 | 1900 | 6.8 | 8.7 | 4 | >10¹⁴ | L |
| 36 | | Good | | | | | | | L |
| 37 | ⑩ | Test specimen was not prepared since glass composition could not be fritted. | | | | | | | |
| 38 | ⑪ | Porous fired body was obtained and not be examined on the properties. | | | | | | | L |
| 39 | ⑫ | Test specimen was not prepared since glass composition could not be fritted. | | | | | | | |

Note:
*1External view is for a large sized substrate with a size of larger than 20 cm × 20 cm. Good: no crack, Crack: Crack occurred.
*2Thermal expansion coefficient was measured in the temperature range of from 40 to 250 ° C.
*3L: Large-sized furnace (sectional area of muffle of 0.1 m²)
S: Small-sized furnace (sectional area of muffle of 0.05 m²)

As will be seen from the above table, B is advantageously not less than 1.5. On the other hand, C is desired to be not greater than 60 m/min. When the value of C exceeds its upper limit, i.e., 60 m/min, or the value of B exceeds 50, green ceramic sheets to be fired drop out of a mounting belt during firing and firing efficiency is considerably reduced. In the foregoing examples, B and C should be changed depending on the thickness of the green sheets and heating rate should be adjusted depending on the values of B and C. For example, when firing thick sheets, heating was slowed down in view of B and C.

Although only acryl resin was employed as a binder in the above examples, other binders, such as butyral resin, can be also employed. Also, as an preferred embodiment of the second invention, only a continuous furnace having a highest firing efficiency is described above. However, the first invention may be practiced employing other furnaces, for example, a batch type furnace.

As described above, in the present invention, green sheets can be fired without accompanying ignition of the decomposition gases which are resulted from decomposition of binders and the decomposition gases are easily driven off, since firing is performed at a rapid heating rate while blowing air in an adequate quantity into a furnace. The low temperature firable ceramic material used in the present invention partly crystallizes in the course of firing and at the earlier stage of firing the sheet rapidly softens, thereby clings the smooth surface of a settor, namely, a firing support. Thus, large-sized ceramic products with a smooth surface can be readily obtained and the resulting fired products exhibit a high heat-resistance and low thermal expansion coefficient. Further, the fired products are not subject to warpage, deformation, crack and deterioration of electrical resistivity because of their high mechanical strength even if they are subjected to repeated heating cycles such as dip soldering.

Since the fired products in accordance to the present invention have a advantageous combination of properties as set forth above, they can be extensively employed as low temperature fired ceramic materials in various industrial applications, such as the manufacturing of electronic parts or components, thermal resistant articles, tablewares, kitchen utensiles and decorative articles and fully satisfy requirements for these applications, for example, a lower production cost and time-saving.

What is claimed is:

1. A method of making a ceramic article which is fired at a relatively low temperature, comprising the steps of:

forming a green sheet from a mixture of an organic binder and a ceramic raw material, said ceramic raw material being firable at a temperature of from 800° to 1000° C. and consisting essentially of, in weight percentages, (a) from 50 to 65% of a powdered, noncrystalline $CaO-Al_2O_3-SiO_2$ glass consisting of
  10 to 55% of CaO,
  45 to 70% of $SiO_2$,
  and 0 to 30% of $Al_2O_3$, as base components, and up to 10% of impurities; and (b) from 50 to 35% of powdered $Al_2O_3$ containing up to 10% of impurities;

then continuously moving said green sheet through an air furnace having a binder-removing zone followed by a sintering zone havng a binder-removing zone followed by a sintering zone wherein, in said binder-removing zone, said green sheet is rapidly heated at a heating rate of from 10° to 200° C./min and simultaneously air is blown through said binder-removing zone of said furnace so that the air feed ratio, is at least 1.5, wherein air feed ratio =

$$\frac{\text{mean molecular weight of said binder} \times \text{inflammability limit of mixed decomposition gases released by decomposition of said binder} \times \text{rate of feed of air}}{\text{rate of feed of green sheet} \times \text{weight ratio of said binder in the green sheet} \times 22.4,}$$

whereby to remove said binder from said sheet, and then, in said sintering zone, sintering said sheet at a temperature of from 800° to 1000° C.

2. A method as claimed in claim 1 in which said sheet is fired until said glass is partially crystallized and crystals of anorthite or anorthite plus calcium silicate are produced.

3. A method as claimed in claim 1 in which said air feed ratio and said heating rate are selected so that the coordinates therefor in the attached FIG. 4 lie above the solid line in the graph in FIG. 4.

4. A method as claimed in claim 1 in which said heating rate is from 20° to 200° C./min.

5. A method of making a ceramic article which is fired at a relatively low temperature, comprisign the steps of:
  forming a green sheet from a mixture of an organic binder and a ceramic raw material, said ceramic raw material being firable at a temperature of from 800° to 1000° C. and consisting essentially of, in weight percentages,
    (a) from 50 to 65% of a powdered, noncrystalline $CaO-Al_2O_3-SiO_2$ glass consisting of
      10 to 55% of CaO,
      45 to 70% of $SiO_2$,
      and 0 to 30% of $Al_2O_3$ as base components, and up to 10% of impurities;
    (b) from 50 to 35% of powdered $Al_2O_3$ containing up to 10% of impurities; and
    (c) up to 20% of $B_2O_3$, based on the sum of (a) and (b);
  then continuously moving said green sheet through an air furnace having a binder-removing zone followed by a sintering zone wherein, in said binder-removing zone, said green sheet is rapidly heated at a heating rate of from 10° to 200° C./min and simultaneously air is blown through said binder-removing zone of said furnace so that the air feed ratio, is at least 1.5, wherein $$\text{air feed ratio} = \frac{\text{mean molecular weight of said binder} \times \text{inflammability limit of mixed decomposition gases released by decomposition of said binder} \times \text{rate of feed of air}}{\text{rate of feed of green sheet} \times \text{weight ratio of said binder in the green sheet} \times 22.4,}$$

whereby to remove said binder from said sheet, then, in said sintering zone, sintering said sheet at a temperature of from 800° to 1000° C.

6. A method as claimed in claim 5 in whcih said sheet is fired until said glass is partially crystallized and crystals of anorthite or anorthite plus calcium silicate are produced.

7. A method as claimed in claim 5 in which said air feed ratio and said heating rate are selected so that the coordinates therefor in the attached FIG. 4 lie above the solid line in the graph in FIG. 4.

8. A method as claimed in claim 5 in which said heating rate is from 20° to 200° C./min.

* * * * *

UNITED STATES PATENT AND TRADEMARK OFFICE
CERTIFICATE OF CORRECTION

PATENT NO. : 4 726 921
DATED : February 23, 1988
INVENTOR(S) : Susumu NISHIGAKI et al It is certified that error appears in the above-identified patent and that said Letters Patent is hereby corrected as shown below:

Column 14, lines 54-55; delete "having a binder removing zone followed by a sintering zone".

Column 15, line 16; change "comprisign" to ---comprising---.

Column 16, line 9; after "ratio" delete ---,---.

Column 16, line 19; after "sheet" insert ---and---.

Column 16, line 22; change "whcih" to ---which---.

Signed and Sealed this

Eleventh Day of October, 1988

Attest:

DONALD J. QUIGG

Attesting Officer

Commissioner of Patents and Trademarks